(12) United States Patent
Chambliss et al.

(10) Patent No.: US 9,104,597 B2
(45) Date of Patent: Aug. 11, 2015

(54) DESTAGING CACHE DATA USING A DISTRIBUTED FREEZER

(71) Applicant: INTERNATIONAL BUSINESS MACHINES CORPORATION, Armonk, NY (US)

(72) Inventors: David D. Chambliss, Morgan Hill, CA (US); Ehood Garmiza, Neve Ziv (IL); Eyal Lotem, Omer (IL); Leah Shalev, Zichron-Yaakov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 13/863,804

(22) Filed: Apr. 16, 2013

(65) Prior Publication Data

US 2014/0310557 A1 Oct. 16, 2014

(51) Int. Cl.
*G06F 11/00* (2006.01)
*G06F 11/10* (2006.01)

(52) U.S. Cl.
CPC .... *G06F 11/1076* (2013.01); *G06F 2211/1009* (2013.01); *G06F 2211/1028* (2013.01); *G06F 2211/1057* (2013.01)

(58) Field of Classification Search
CPC . G06F 11/10; G06F 11/1064; G06F 11/1056; G06F 11/108; G06F 12/0813; G06F 2211/1009; G06F 2211/1028; G06F 2211/1035; G06F 2211/1057; H03M 13/11
See application file for complete search history.

(56) References Cited

U.S. PATENT DOCUMENTS 6,012,123 A * 1/2000 Pecone et al. ................. 711/114
6,101,615 A * 8/2000 Lyons .......................... 714/6.21
6,775,738 B2 8/2004 Ash et al.

(Continued)

FOREIGN PATENT DOCUMENTS

CN 1664793 A 9/2005
CN 101997918 A 3/2011

(Continued)

OTHER PUBLICATIONS

Sivathanu et al., "Improving Storage System Availability with D-GRAID," ACM Transactions on Storage, vol. 1, No. 2, May 2005, http://pages.cs.wisc.edu/~muthian/dgraid-tos.pdf.

(Continued)

*Primary Examiner* — Marc Duncan
(74) *Attorney, Agent, or Firm* — Griffiths & Seaton PLLC

(57) ABSTRACT

Methods, apparatus and computer program products implement embodiments of the present invention that enable digital information devices having respective storage devices and memories to distributedly store, for a logical volume, data and first and second parity values across corresponding regions of the storage devices. Freezers having a one-to-one correspondence with the storage devices are distributedly stored in the memories. Upon detecting, in a cache, updated data for one or more first regions on the storage devices, existing data from the one or more first regions, and additional data for parity calculations are retrieved from one or more corresponding second regions on the storage devices, and first and the second parity values are calculated using the updated data, the existing data and the additional data. The updated data and the calculated first and second parity values are stored to the freezers, and then destaged from the freezers to the storage devices.

20 Claims, 6 Drawing Sheets

(56) References Cited

U.S. PATENT DOCUMENTS

| | | |
|---|---|---|
| 7,593,974 B2 | 9/2009 | Suzuki et al. |
| 7,657,509 B2 | 2/2010 | Clark et al. |
| 7,849,356 B2 | 12/2010 | Jones et al. |
| 7,945,732 B2 | 5/2011 | Koseki |
| 7,987,158 B2 | 7/2011 | Boyd et al. |
| 8,103,904 B2 * | 1/2012 | Hafner et al. ............ 714/6.24 |
| 8,112,395 B2 | 2/2012 | Patel et al. |
| 8,156,368 B2 * | 4/2012 | Chambliss et al. .......... 714/6.24 |
| 2002/0091897 A1 | 7/2002 | Chiu et al. |
| 2002/0170017 A1 * | 11/2002 | Busser ..................... 714/800 |
| 2004/0093464 A1 * | 5/2004 | Hassner et al. ............. 711/114 |
| 2004/0128269 A1 | 7/2004 | Milligan et al. |
| 2006/0123270 A1 * | 6/2006 | Forhan et al. .................... 714/6 |
| 2006/0294301 A1 | 12/2006 | Zohar et al. |
| 2007/0028145 A1 * | 2/2007 | Gerhard et al. ................. 714/36 |
| 2007/0067667 A1 * | 3/2007 | Ikeuchi et al. .................... 714/6 |
| 2007/0079083 A1 | 4/2007 | Gladwin et al. |
| 2008/0040553 A1 | 2/2008 | Ash et al. |
| 2008/0195807 A1 | 8/2008 | Kubo et al. |
| 2008/0201608 A1 * | 8/2008 | Forhan et al. ................... 714/15 |
| 2009/0049050 A1 * | 2/2009 | Whitehead ..................... 707/10 |
| 2009/0089612 A1 * | 4/2009 | Mathew et al. .................... 714/6 |
| 2011/0153606 A1 | 6/2011 | Kim et al. |
| 2011/0161299 A1 | 6/2011 | Prahlad et al. |
| 2011/0202792 A1 * | 8/2011 | Atzmony ..................... 714/6.24 |
| 2011/0208912 A1 | 8/2011 | Chambliss et al. |
| 2011/0208943 A1 | 8/2011 | Schott |
| 2011/0225453 A1 | 9/2011 | Spry et al. |
| 2011/0258391 A1 | 10/2011 | Atkisson et al. |
| 2011/0282835 A1 | 11/2011 | Cannon et al. |
| 2014/0310244 A1 | 10/2014 | Chambliss et al. |
| 2014/0310456 A1 | 10/2014 | Chambliss et al. |
| 2014/0310457 A1 | 10/2014 | Chambliss et al. |
| 2014/0310464 A1 | 10/2014 | Chambliss et al. |
| 2014/0310465 A1 | 10/2014 | Chambliss et al. |
| 2014/0310489 A1 | 10/2014 | Chambliss et al. |

FOREIGN PATENT DOCUMENTS

| | | |
|---|---|---|
| CN | 102185929 A | 9/2011 |
| WO | 2014170791 A3 | 10/2014 |

OTHER PUBLICATIONS

Ripberger et al., "IBM System Storage DS8000 Storage Virtualization Overview," IBM, Apr. 13, 2010.

Rodeh, "B-trees, Shadowing and Clones," ACM Transactions on Computational Logic, vol. V, No. N, IBM, Aug. 2007.

* cited by examiner

DESTAGING CACHE DATA USING A DISTRIBUTED FREEZER

CROSS-REFERENCE TO RELATED APPLICATIONS

This application is related to U.S. Patent Applications titled "Essential Metadata Replication", "Parallel Destaging With Replicated Cache Pinning", "Fine-Grained Control of Data Placement", "Backup Cache With Immediate Availability", "Managing Metadata and Data For a Logical Volume in a Distributed and Declustered System" and "Logical Region Allocation With Immediate Availability" filed on even date with the present application, and which is incorporated herein by reference.

FIELD OF THE INVENTION

The present invention relates generally to data storage, and specifically to destaging data from a cache to multiple physical devices.

BACKGROUND

A storage system storing logical volume data in a redundant array of independent disks (RAID) 6 configuration stripes the volume data across corresponding physical regions on two or more data storage devices, and stores two parity values to corresponding physical regions on two parity storage devices. As a result of mathematical calculations (e.g., Reed Solomon encoding calculations), storage devices arranged in a RAID 6 configuration have an ability to recover from a failure of any two of the storage devices.

An additional feature of RAID 6 is an ability, while processing a write operation, to recalculate the two parity values without retrieving all the corresponding physical regions on the data storage devices. For example, while processing a request to write new data to a given one of the storage devices, the two parity values can be calculated using the new data, existing data currently stored on given one of the storage device that is to be replaced with the new data, and two existing current parity values currently stored on the parity storage devices. Therefore, to process a request to write data to a given data storage device in a RAID 6 8+2 configuration, the two parity values can be calculated with data obtained via three read operations.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY

There is provided, in accordance with an embodiment of the present invention a method, including arranging multiple digital information devices having respective storage devices and memories to communicate within a network, distributedly storing, for a logical volume, data and first and second parity values across corresponding physical regions of the storage devices, distributedly storing, in the memories, multiple freezer nodes having a one-to-one correspondence with each of the multiple storage devices, detecting, in a cache for the logical volume, updated data for one or more first physical regions on the storage devices, retrieving existing data from the one or more first physical regions, and additional data for use in parity calculations from one or more corresponding second physical regions on the storage devices, calculating the first and the second parity values using the updated data, the existing data and the additional data, storing the updated data and the calculated first and second parity values to the freezer nodes, and destaging the updated data and the calculated first second parity values from the freezer nodes to the corresponding storage devices.

There is also provided, in accordance with an embodiment of the present invention an apparatus, including multiple digital information devices arranged on a network and having respective memories and storage devices, and a separate processor coupled to each of the respective memories and configured to distributedly store, for a logical volume, data and first and second parity values across corresponding physical regions of the storage devices, to distributedly store, in the memories, multiple freezer nodes having a one-to-one correspondence with each of the multiple storage devices, to detect, in a cache for the logical volume, updated data for one or more first physical regions on the storage devices, to retrieve existing data from the one or more first physical regions, and additional data for use in parity calculations from one or more corresponding second physical regions on the storage devices, to calculate the first and the second parity values using the updated data, the existing data and the additional data, to store the updated data and the calculated first and second parity values to the freezer nodes, and to destage the updated data and the calculated first second parity values from the freezer nodes to the corresponding storage devices.

There is further provided, in accordance with an embodiment of the present invention a computer program product, the computer program product including a non-transitory computer readable storage medium having computer readable program code embodied therewith, the computer readable program code including computer readable program code configured to arrange multiple digital information devices having respective storage devices and memories to communicate within a network, computer readable program code configured to distributedly store, for a logical volume, data and first and second parity values across corresponding physical regions of the storage devices, computer readable program code configured to distributedly store, in the memories, multiple freezer nodes having a one-to-one correspondence with each of the multiple storage devices, computer readable program code configured to detect, in a cache for the logical volume, updated data for one or more first physical regions on the storage devices, computer readable program code configured to retrieve existing data from the one or more first physical regions, and additional data for use in parity calculations from one or more corresponding second physical regions on the storage devices, computer readable program code configured to calculate the first and the second parity values using the updated data, the existing data and the additional data, computer readable program code configured to store the updated data and the calculated first and second parity values to the freezer nodes, and computer readable program code configured to destage the updated data and the calculated first second parity values from the freezer nodes to the corresponding storage devices.

BRIEF DESCRIPTION OF THE DRAWINGS

The disclosure is herein described, by way of example only, with reference to the accompanying drawings, wherein.

DETAILED DESCRIPTION OF EMBODIMENTS

Storage systems may implement multiple instances of a write cache in order to provide resiliency against hardware and/or software failures that may occur while destaging data from a cache to one or more storage devices. Embodiments of the present invention provide methods and systems for implementing an "in-memory RAID 6" in a distributed system comprising multiple digital information devices (e.g., modules of a storage controller, as described hereinbelow) having respective storage devices and memories that are configured to communicate within a network.

In some embodiments, while writing data to one or more physical regions of storage devices configured as a RAID 6 array, a single copy of all the data tracks and corresponding parity values can be "frozen" in memories of separate physical nodes of a storage system. Therefore, the same resiliency schemes that are be provided by a RAID 6 configuration of storage devices can also be applied to the data and the parity values stored on separate physical nodes.

Additionally, spreading the data and the parity tracks over multiple nodes enables the storage system to release data from memory immediately after successfully destaging the data to a given physical region of a given storage device in a RAID 6 storage array, even though there might be additional data in memory that has not yet been destaged to physical regions on additional storage devices in the array. In other words, instead of keeping all data in the cache for the whole duration of the destage operation, either cached or up-to-date on-disk data may be used for each of the corresponding physical regions, providing all the corresponding physical regions (of the RAID 6 array) are in separate failure domains. Embodiments of the present invention enable the destage process to utilize less memory, for less time.

In embodiments described herein, volume and cache data may be stored to a distributed system implemented on a clustered storage controller comprising multiple modules, wherein each module comprises multiple storage devices. The clustered storage controller can implement a distributed file system (also known as a clustered file system) which can be shared by being simultaneously mounted on the multiple modules. The ability of the clustered storage controller to distribute specific data (e.g., volume data and volume cache data) among the storage devices in the clustered storage controller is referred to herein as "distributedly storing" the specific data.

For example, volume data for a given logical volume can be distributedly stored by defining a RAID storage configuration utilizing at least four storage devices (i.e., RAID 6 2+2) for each volume data stripe. Likewise, cache data for the logical volume can also be distributed among random access memories (RAM) of the modules in order to enhance resiliency of the metadata. In the example described hereinbelow, the cache data is distributedly stored to "freezer nodes", in each module's RAM.

Figure 1:
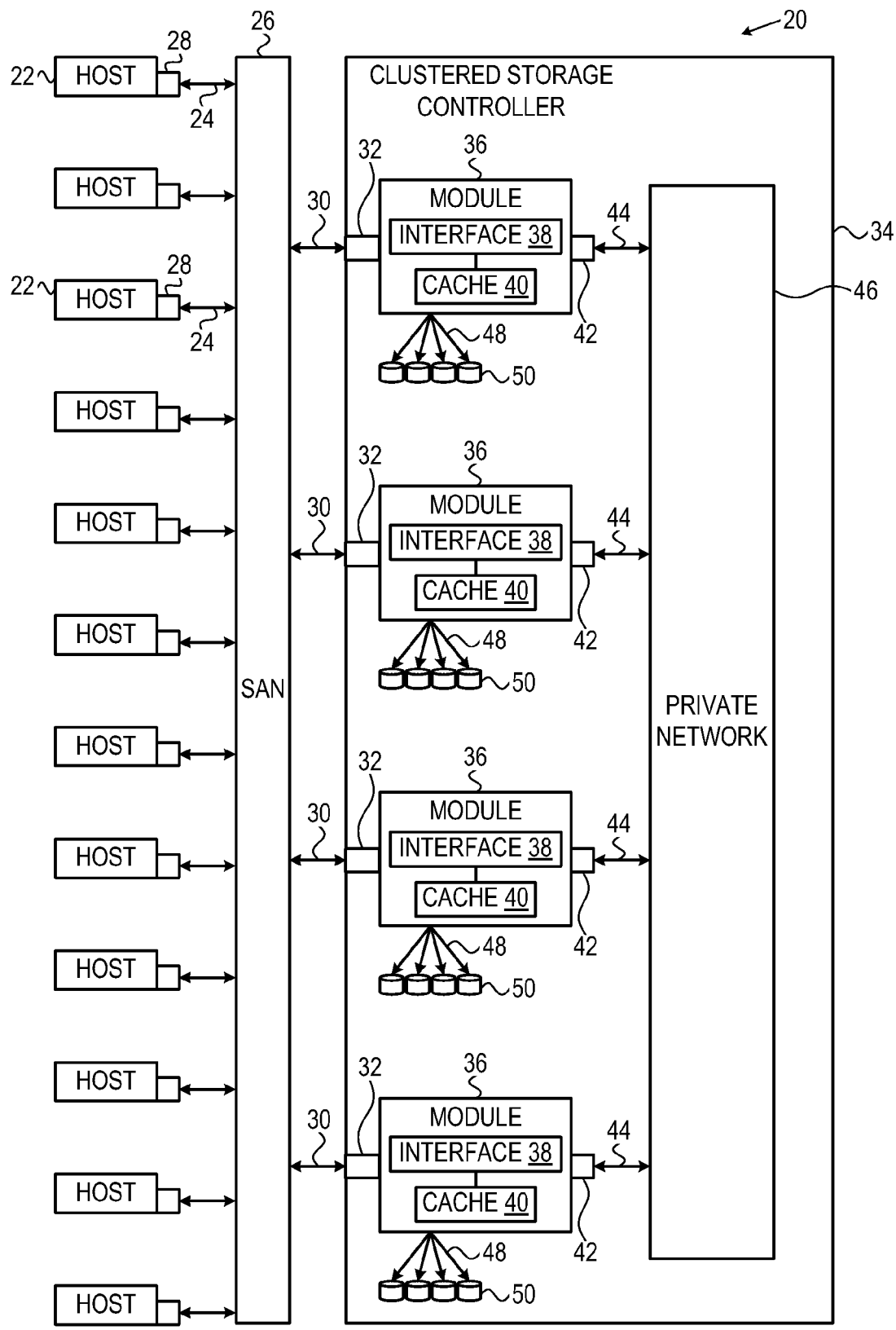
FIG. 1 is a block diagram that schematically illustrates a storage system, in accordance with an embodiment of the present invention.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in Figure shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
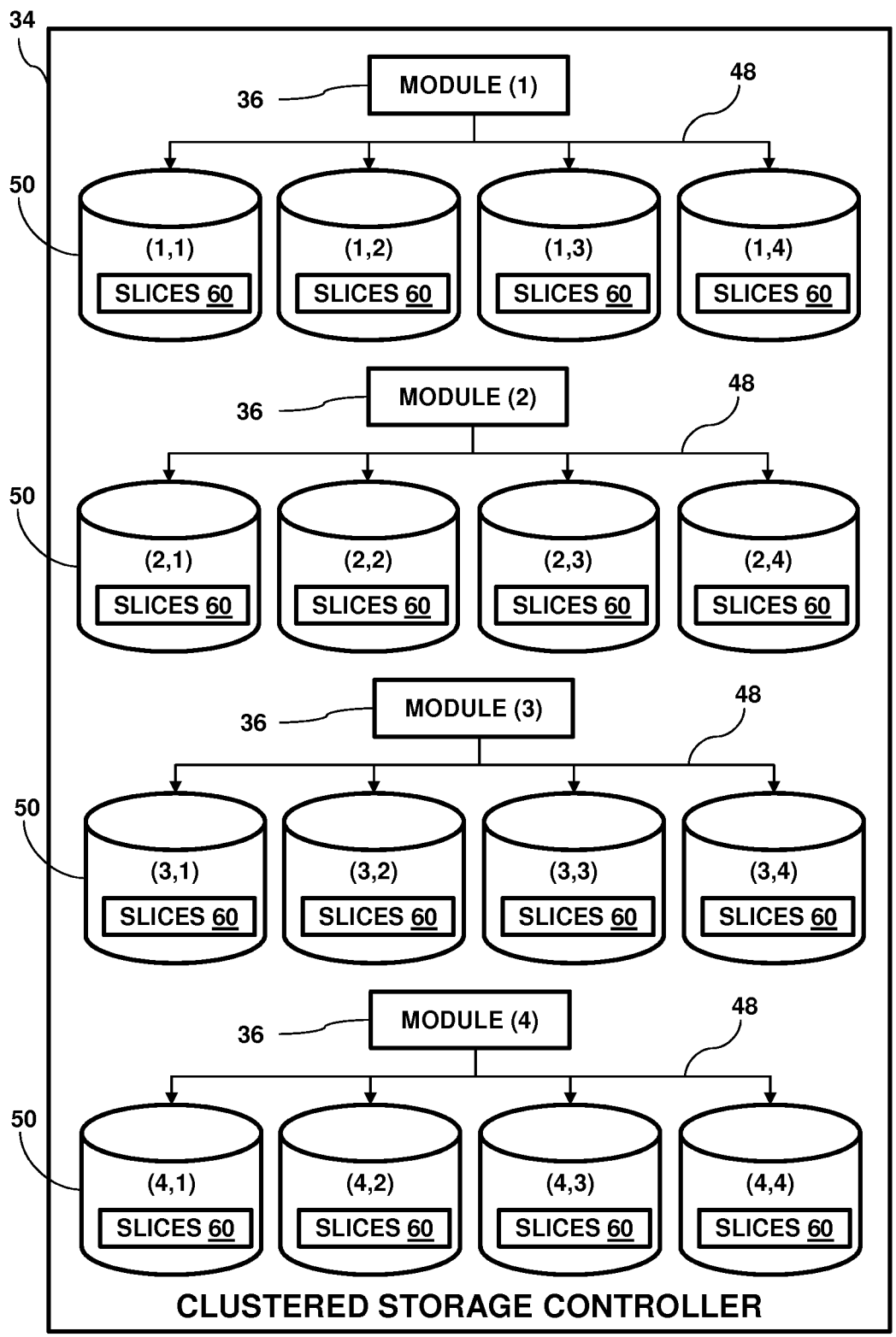
FIG. 2 is a block diagram that schematically illustrates an example of storage management units stored on a storage system, in accordance with an embodiment of the present invention.

FIG. 2 is a block diagram that schematically illustrates an example of storage management units (SMU) configured as slices 60 stored on storage devices 50 of clustered storage controller 34 (also referred to herein as a storage system), in accordance with an embodiment of the present invention. While the embodiments herein describe distributing metadata storage for slices 60, distributing metadata storage for other types of storage management units is considered to be within the spirit and scope of the present invention. For example, the embodiments described herein can be used to distribute metadata for other types of storage management units such as logical volumes and storage pools.

Additionally, in the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Furthermore, each storage device 50 may be referenced by an ordered pair (A,B), where A is defined above, and where B is a number representing a given storage device 50 coupled to the given module via data connection 48. For example, storage devices 50(3,1), 50(3,2), 50(3,3) and 50(3,4) are coupled to module 36(3) via data connection 48.

Figure 3A:
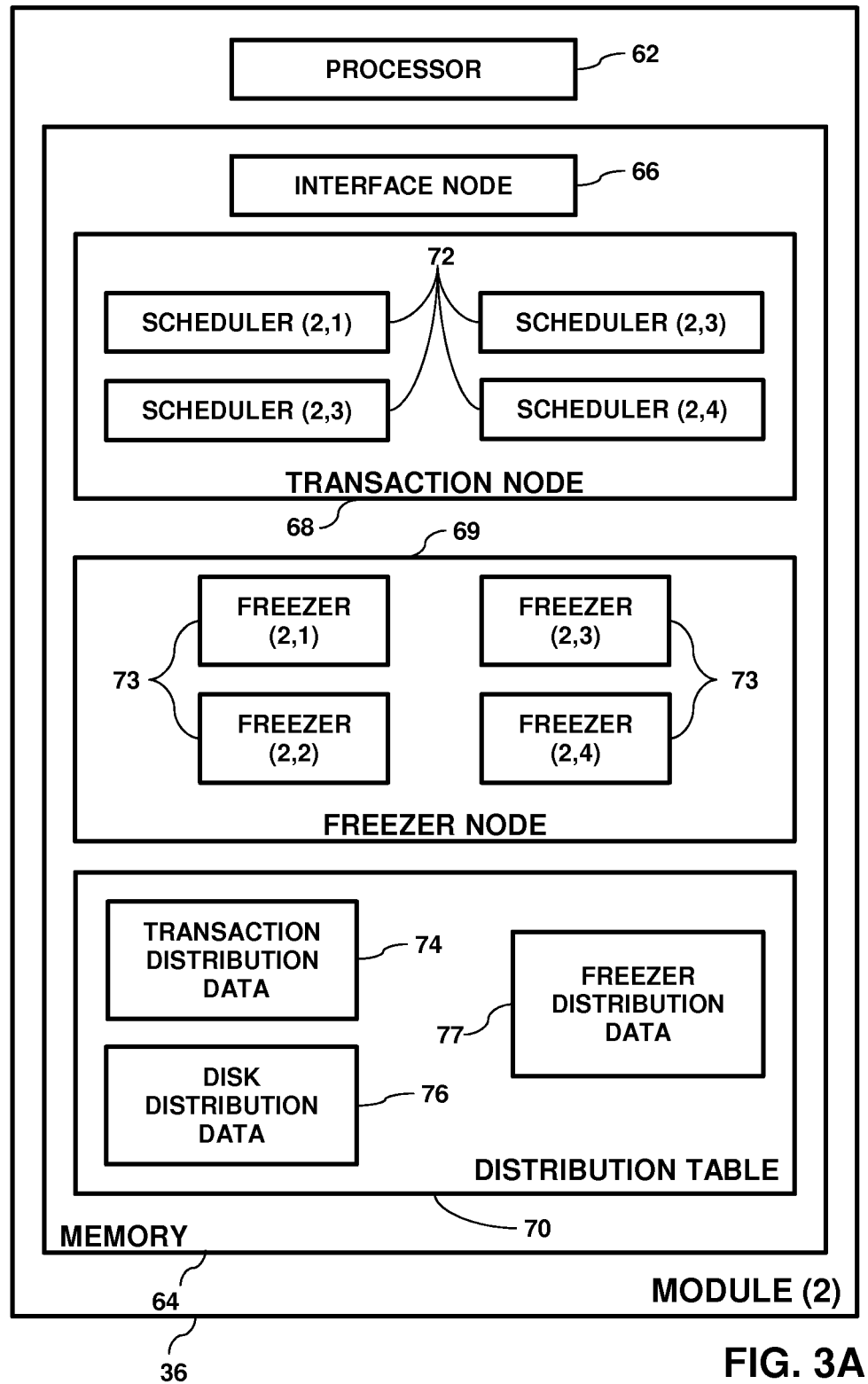
FIGS. 3A-3C, referred to collectively as FIG. 3, are block diagrams that schematically show functional elements of a module of the storage system, in accordance with an embodiment of the present invention.

FIG. 3A is a block diagram that schematically illustrates functional elements of module 36, in accordance with an embodiment of the present invention. Module 36 comprises a processor 62 and a memory 64. For a given module 36 configured to include adapter 32, memory 64 comprises an interface node 66 (i.e., not all memories 36 in storage system 20 include the interface node). Memory 36 also comprises a transaction node 68, a freezer node 69, and a distribution table 70. In operation, processor 62 executes interface node 66 and transaction node 68 from memory 64.

Processor 62 typically comprises a general-purpose computer, which is programmed in software to carry out the functions described herein. The software may be downloaded to processor 62 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

Interface node 66 comprises a software application that is configured to receive I/O requests from a given host computer 22, and to convey the I/O request to a given transaction node 68. Additionally, upon the given transaction node completing the I/O request, interface node 66 conveys a result of the I/O request to the given host computer. For example, if the I/O request comprises a write operation, then the conveyed result may comprise an acknowledgement of the write. Alternatively, if the I/O request comprises a read operation, then the conveyed result may comprise data retrieved from storage devices 50.

Transaction node 68 comprises a software application that processes I/O requests via multiple schedulers 72, which manage a set of slices 60. While the configuration of transaction node 68 shown in FIG. 3A comprises four schedulers 72, any number of schedulers is considered to be within the spirit and scope of the present invention. In some embodiments, processor 62 may execute each scheduler 72 on a separate thread (also known as a logical core) of the processor.

In embodiments described herein, each scheduler 72 may be referenced by an ordered pair (A,C), where A is defined above, and C is a number representing a given scheduler 72 executing within the given module. In the example shown in FIG. 3A, the first scheduler 72 in module 36(2) may be referred to herein as scheduler 72(2,1), the second scheduler 72 in module 36(2) may be referred to herein as scheduler 72(2,2), the third scheduler in module 36(2) may be referred to herein as scheduler 72(2,3), and the fourth scheduler 72 in module 36(2) may be referred to herein as scheduler 72(2,4).

As described supra, storage controller 34 may configure a logical volume as a set of slices 60, wherein each of the slices comprises a set of regions on a given storage device 50. For example, a given logical volume may comprise four slices 60 spread over storage devices 50(1,2), 50(2,3), 50(3,4) and 50(4,2). There may be instances where a given storage device stores more than one slice for a given logical volume. Additionally, as described in detail hereinbelow, processor 62 may store multiple copies of a given slice. For example, processor 62 may store a first copy of a given slice 60 on a first storage device 50 (also referred to herein as the primary storage device for the given slice), and an additional copy of the given slice on a second storage device 50 (also referred to herein as the secondary storage device for the given slice).

In embodiments of the present invention, each slice 60 can be associated with a first scheduler 72 that can be configured as a master scheduler, and one or more additional schedulers 72 that can be configured as backup schedulers. Differences between the master and the backup schedulers are described hereinbelow. In the event of a failure of the master scheduler, processor 62 can reconfigure one of the backup schedulers to function as the master scheduler, thereby ensuring the continuous availability of data stored in storage controller 34.

As described supra, processor 62 may store a first copy of a given slice 60 on a primary storage device 50, and an additional copy of the given slice on one or more secondary storage devices 50. In the event of a failure of the primary storage device, processor 62 can reconfigure one of the secondary storage devices to function as the primary storage device, thereby ensuring the continuous availability of data stored in storage controller 34.

Freezer node 69 comprises a software application that processes requests to destage data from a given cache 40 to a given storage device 50, via freezers 73, each of which has a corresponding given storage device 50. Each freezer 73 comprises a data structure configured to store data elements to be destaged to one or more physical regions on a given storage device 50. The data elements may comprise updated data for a given logical volume or parity values (e.g., first and second parity values in a RAID 6 configuration) calculated for the logical volume. In embodiments described herein, each freezer may be referenced by an ordered pair (A,F), where A is defined above, and F is a number representing a given freezer 73 within the given module.

Processor 62 can store associations between the slices, the schedulers and the storage devices to distribution table 70. Distribution table 70 comprises transaction distribution data 74, disk distribution data 76 and freezer distribution data 77. Transaction distribution data 74 can be configured to store associations between the slices and the schedulers, disk distribution data 76 can be configured to store associations between the slices and the storage devices, and freezer distribution data 77 can be configured to store associations between the storage devices and freezers 73.

Figure 3B:
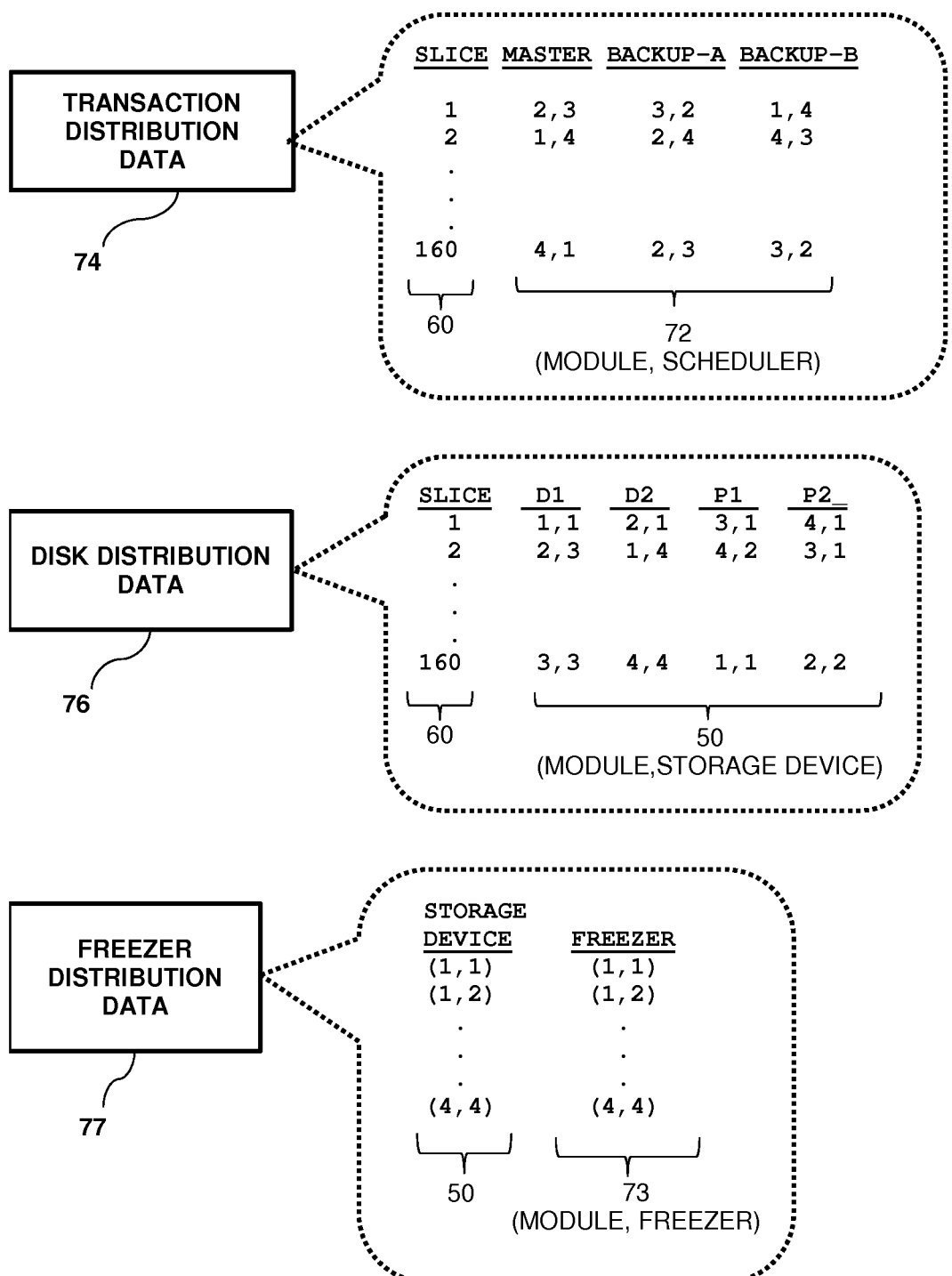

FIG. 3B is a block diagram that schematically illustrates example entries in transaction distribution data 74, disk distribution data 76 and freezer distribution data 77 in accordance with an embodiment of the present invention. In the example shown in FIG. 3B, each slice 60 is associated with a master and two backup schedulers 70, and two data and two parity storage devices 50.

In the embodiments described herein, each slice may be referenced by an identifier (D), where D is a number representing a given slice 60. In the configuration shown in FIGS. 3B-3D, storage controller 34 comprises 160 slices 60 that can be referenced as slice 60(1)-slice 60(160). Identifier D is also referred to herein as a slice number, so that each slice 60 has an associated slice number, and in the example D is an integer between 1 and 160. As shown in transaction distribution data 74, scheduler 72(2,3) is configured as the master scheduler and schedulers 72(3,2) and 72(1,4) are configured as the backup schedulers (i.e., BACKUP1 and BACKUP-B as shown the figure) for slice 60 (1).

In embodiments described herein, storage controller 34 implements a RAID 6 2+2 configuration for slices 60 as follows:

Two storage devices 50 storing the data regions are referred to as D1 and D2. For example, each one megabyte partition may comprise two 512K regions striped across D1 and D2.

Two storage devices 50 storing the parity computations for D1 and D2 are referred to as P1 and P2.

Each region on a given storage device 50 in a RAID 6 configuration has corresponding regions in the other storage devices in the RAID 6 configuration. In the configuration shown in FIG. 3B, upon interface node 66 receiving a request to write first data to a volume number and logical address referencing a first region on a first storage device (e.g., D1), transaction node 68 stores the first data to cache 40, conveys the first data to the backup scheduler(s) for the slice to be stored in their cache(s), and conveys an acknowledgment indicating completion of the write operation. At some later time, the transaction node retrieves second data from a corresponding second region on a second storage device (e.g., D2), stores the second data to cache 40, conveys the second data to the backup scheduler(s) to be stored in their cache(s), and performs two parity computations based on the first and the second data. At some second later time, the transaction node can destage the first data to the first region, and the parity values to the corresponding regions on the storage devices referenced by P1 and P2. The corresponding regions on the storage devices referenced by P1 and P2 are also referred to herein as corresponding parity regions.

In the configuration shown in FIG. 3B, disk distribution data 76 stores the RAID 6 configuration for each slice 60. For example, slice 60(1) comprises storage device 50(1,1) configured as D1, storage device 50(2,1) configured as D2, storage device 50(3,1) as P1 and storage device 50(4,1) as P2. As shown in the Figure, there may be different RAID 6 disk distributions for different slices 60. For example, slice 60(2) comprises storage device 50(2,3) configured as D1, storage device 50(1,4) configured as D2, storage device 50(4,2) as P1 and storage device 50(3,1) as P2.

Freezer distribution data 77 identifies a given freezer 73 for each storage device 50. While the configuration shown in FIG. 3B co-locates corresponding storage devices 50 and freezers 73 on the same module 36 (e.g., freezer 73(1,1) stores data to be destaged to storage device 50(1,1) other configurations are considered to be within the spirit and scope of the present invention. However, for resiliency purposes, a given freezer 73 for a first storage device 50 used in a given RAID configuration cannot be co-located on the same module 36 as a second storage device 50 used in the given RAID configuration (i.e., the given freezer and the second storage device cannot share a failure domain). In other words, the given freezer 73 for the first storage device 50 used in the given RAID configuration can be co-located with either the corresponding storage device or none of the storage devices in the given RAID configuration.

As shown in the figures, for a given slice 60 (i.e., a given SMU), the master scheduler, the backup scheduler(s), the primary storage device and the secondary storage device(s) can be distributed among different modules 36 of storage system 20. Additionally, each module 36 may store any number (including zero) of master and backup schedulers 72.

Figure 3C:
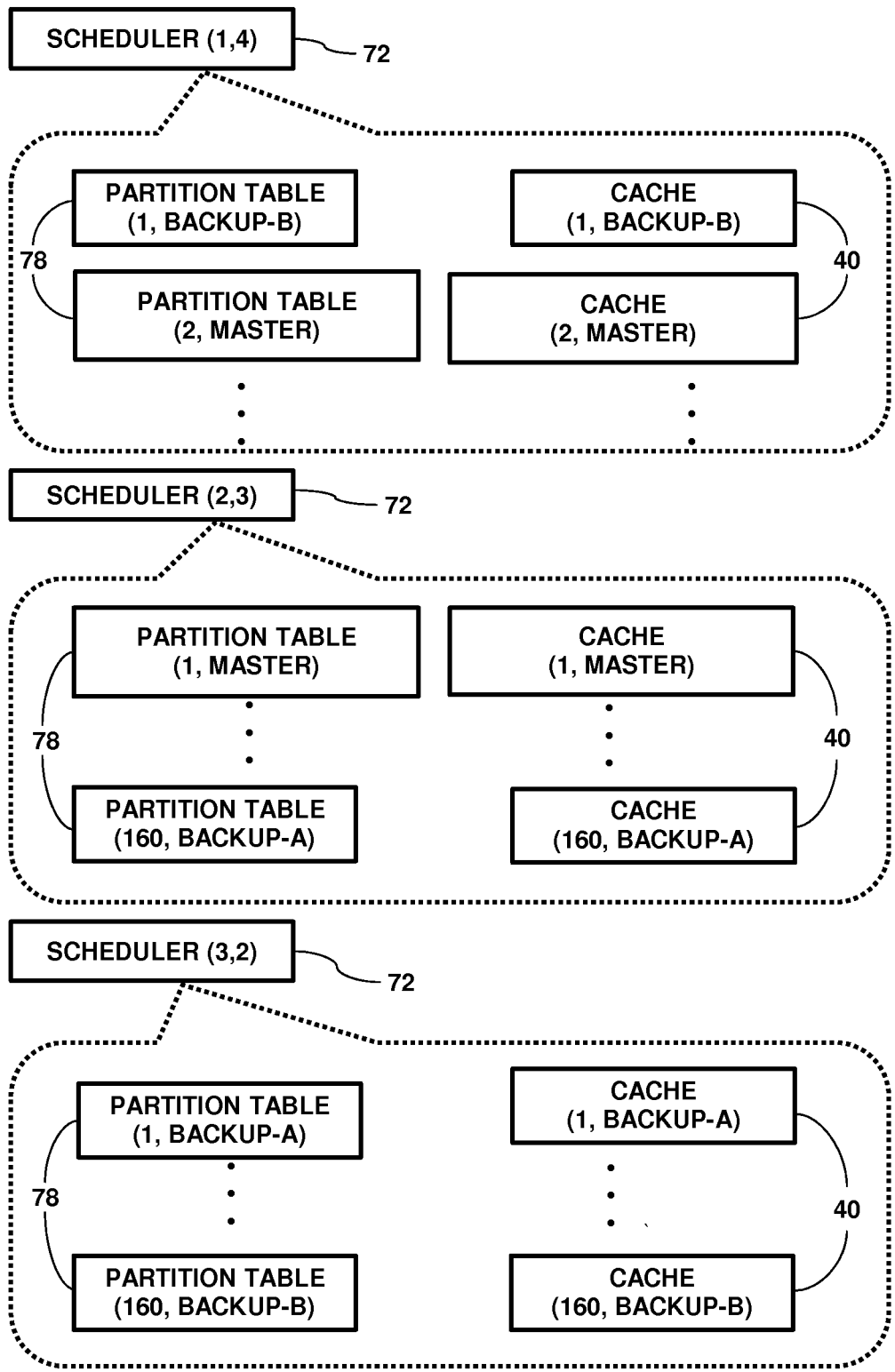

FIG. 3C is a block diagram that schematically illustrates schedulers 72(1,4), 72(2,3) and 72(3,2) in accordance with an embodiment of the present invention. Each scheduler 72 comprises pairs of partition tables 78 and caches 40, wherein each of the pairs is associated with a given slice 60. Each entry in a given partition table 78 corresponds to a partition (i.e., a region) on a given storage device 50, and comprises a data structure (e.g., an array) that enables processor 62 to map a given volume number and logical address to the partition. Operation of caches 40 is described in FIG. 1, hereinabove.

As described supra, each scheduler 72 can be associated with a given slice 60 and can function as either a master scheduler or a backup scheduler for the given slice. In the example shown in FIGS. 3B-3C, each slice 60 has a master scheduler 72 ("MASTER") and two backup schedulers 72 ("BACKUP-A" and "BACKUP-B"). Likewise, each partition table 78 may be referenced by an ordered pair (D,E), where D is a number representing a given slice 60, and E describes a role of a given partition table 78, and each cache 40 may be referenced by an ordered pair (D,F), where D is defined above, and F describes a role of a given cache 40. In embodiments described herein each slice 60 has a master cache 40 and two backup caches 40 (i.e., BACKUP-A and BACKUP-B).

Continuing the example described supra, the schedulers shown in FIG. 3C comprise the schedulers associated with slice 60(1). As shown in the Figure, scheduler 72(2,3) comprises partition table 78(1, MASTER) and cache 40(1, MASTER), scheduler 72(3,2) comprises partition table 78(1, BACKUP-A) and cache 40(1, BACKUP-A), and scheduler 72(1,4) comprises partition table 78(1, BACKUP-B) and cache 40(1, BACKUP-B).

In embodiments described herein, processor 62 can map an I/O request to a given scheduler 72, as opposed to mapping the I/O request to a given module 36 or a given storage device 50. By mapping I/O requests to schedulers 72, embodiments of the present convention "decouple" partition tables 78 from storage devices 50. In other words, upon receiving an I/O request, interface node 66 may convey the I/O request to a first module 36 executing a given scheduler 72 comprising a given partition table 78, wherein the given partition table references a given storage device 50 coupled to a second module 36.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In-MEMORY RAID 6

Figure 4:
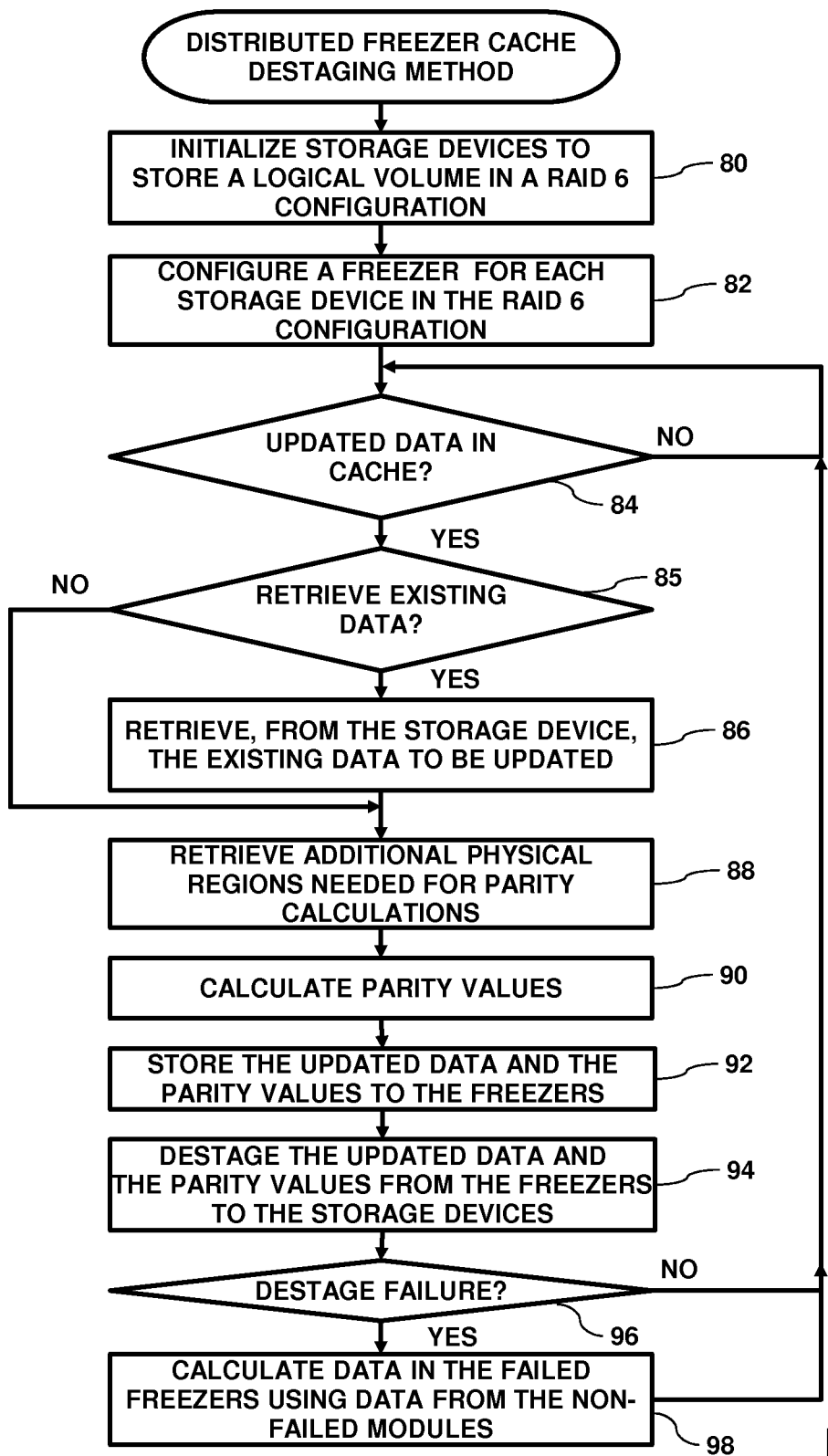
FIG. 4 is a flow diagram that schematically illustrates a method of destaging data from a distributed freezer to storage devices of the storage system, in accordance with an embodiment of the current invention.

FIG. 4 is a flow diagram that schematically illustrates a method of using freezers 73 to destage data from a given cache 40 to storage devices 50 in accordance with an embodiment of the current invention. In the example described in the flow diagram, processor 62 first defines a logical volume in the configuration shown in FIG. 3, and receives a request to write data to one or more physical regions on storage device 50 (2,3) (i.e., "D1") in slice 60 (2). Additionally, while performing steps 84-98 described hereinbelow, processor 62 is executing a given scheduler 72 that is configured as a master scheduler for a given slice 60, and the given scheduler has one or more backup schedulers 72.

In an initialization step 80, processor 62 initializes storage devices 50 to distributedly store a logical volume as data and first and second parity values across corresponding physical regions of four storage devices arranged in a RAID 6 configuration. To initialize the storage devices, processor 62 can define, in disk distribution data 76, a logical disk distribution as a RAID 6 2+2 configuration having two data storage devices 50 (D1 and D2) and two parity storage devices 50 (P1 and P2), as shown in FIG. 3B.

While the example in FIG. 3B shows slices 60 for a given logical volume configured in a RAID 6 2+2 configuration, other RAID 6 configurations (e.g., 6+2 and 8+2) are considered to be within the spirit and scope of the present invention. Additionally, in some embodiments, processor 62 may store the logical volume as multiple slices 60 on storage devices 50, and the multiple slices may be configured to store data in more than one RAID configurations. Maintaining multiple RAID configurations for different slices 60 of a given logical volume is described in more detail in U.S. Patent Application "Fine-Grained Control of Data Placement", referenced above.

In a configuration step 82, processor 62 configures four freezers 73 for the logical volume, so that the freezers have a one-to-one correspondence with the four storage devices in the RAID 6 configuration. Processor 62 can distribute the defined freezer to separate failure domains, as described supra.

In a first comparison step 84, processor 62 monitors cache 40, and if the processor detects (i.e., in the cache) updated data for one or more first physical regions on one or more first storage devices 50, then in a second comparison step 85, the processor chooses whether or not to retrieved existing data from the identified one or more first physical regions.

As described supra, while processing a request to write updated data to a given one of the storage devices 50 (i.e., in a RAID 6 configuration), processor 62 can calculate the two parity values using the updated data, existing data currently stored on given one of the storage device that is to be replaced with the updated data, and two existing current parity values currently stored on the parity storage devices. However, there may be instances when processor 62 can calculate the two parity values without reading the existing data. Instances when processor 62 can calculate the two parity values without reading the existing data include, but are not limited to:

Cache 40 storing updated data for all corresponding physical regions of the data storage devices. For example, if storage devices 50 for a logical volume are configured in a RAID 6 2+2 configuration, and cache 40 stores updated data for corresponding regions of the two data storage devices, then processor 62 can calculate the two parity values using only the updated data.

Storage devices 50 for a logical volume being configured in a RAID 6 2+2 configuration and cache 40 stores updated data for one or more physical regions on a first of the data storage devices. Processor 62 can calculate the two parity values using the updated data and additional data retrieved from one or more corresponding physical regions on a second of the data storage devices and the two parity storage devices.

If processor 62 chooses to retrieve the existing data, then in a first retrieval step 86, the processor retrieves existing data from the identified one or more first physical regions. In a second retrieval step 88, processor 62 retrieves additional data from one or more corresponding second physical regions (on second storage devices 50) that the processor will use when calculating the two parity values for each stripe of physical regions storing data in the RAID 6 configuration.

In some embodiments, processor 62 can perform either one or two read operations in step 88 in order to retrieve the additional data. The second physical regions may comprise either one or more corresponding physical regions on one or more of the data storage devices or one or more corresponding physical regions on each of the two parity storage devices. For example, if there are X data storage devices in the RAID 6 configuration and cache 40 contains updated data for Y corresponding physical regions, then:

If $(X-Y)>=3$, then there are at least three data storage devices in the RAID 6 configuration not having updated data in cache 40. Therefore, in step 88, processor 62 performs two read operations to retrieve a first existing parity value from a first of the parity storage devices and a second existing parity value from a second of the parity storage devices. In other words, the additional data comprises the first and the second parity values.

If $(X-Y)=2$, then there are two data storage devices in the RAID 6 configuration not having updated data in cache 40. Therefore, in step 88 processor 62 can perform two read operations to either retrieve a first existing parity value from a first of the parity storage devices and a second existing parity value from a second of the parity storage devices, or retrieve existing data from corresponding regions on the two data storage devices not having updated data in the cache. In other words, the additional data comprises either the corresponding first and the second parity values, or the corresponding non-updated data values in the RAID array.

If $(X-Y)=1$, then there is one data storage device in the RAID 6 configuration not having updated data in cache 40. Therefore, in step 88 processor 62 can perform a single read operation to retrieve existing data from the corresponding physical region on the data storage device not having updated data in the cache. In other words, the additional data comprises the corresponding non-updated data value in the RAID array.

In a calculation step 90, processor 62 calculates first and second parity values using the existing data, the updated data and the additional data, and in a store step 92, the processor stores the updated data and the first and the second parity values to the appropriate freezers 73. Continuing the example described above, if processor 72 detects updated data for storage device 50(2,3) in cache 40, then the processor retrieves existing data from storage device 50(2,3), additional data from storage device 50(1,4), calculates first and second parity values using the existing and the additional data, and stores the updated data to freezer 73(2,3), the first parity value to freezer 73(4,2) and the second parity value to freezer 73(3, 1).

In the configuration shown in FIG. 3, upon storing the updated data and the first and the second parity values to their respective freezers 73, the given scheduler configured as the master scheduler has information indicating which physical regions are still in each freezer 73. Processor 62 can then convey the information indicating the physical regions the backup schedulers. In some embodiments, freezers 73 can be configured to convey a notification to the master scheduler upon destaging updated data to a given storage device 50.

Therefore, in the event of a hardware and/or a software failure in a first module 36 having a given scheduler 72 configured as a master scheduler, a backup scheduler 72 (i.e., for the master scheduler) that is executing on a second module 36 can identify any updated data in a given freezer node 73 that may, or may not have been destaged to a given storage device 50. In some embodiments, the processor in the second module 36 can destage the updated data, even the backup scheduler received a notification that the updated data was destaged, in order to ensure that the updated data is destaged successfully.

In a destaging step 94, processor 62 destages the updated data and the first and the second parity values from freezers 73 to their corresponding storage devices 50. Upon destaging data from each of the freezers to its corresponding storage device 50, processor 62 can release the destaged data from the freezer.

In a third comparison step 96, if there was a failure to destage data from one or two of the freezers to their corresponding storage devices 50, i.e., processor 62 successfully destaged first data from a first set of the freezer nodes and failed to destage second data from a second set of the freezer nodes due to a hardware and/or a software failure in one or two modules storing the one or two of the freezers, then in a recovery step 98, processor 62 uses the first data and further data from non-failed modules (i.e., the processor retrieves further data from further corresponding regions on the storage devices) to calculate the second data, as is known in the art, and the method continues with step 84.

Returning to step 96, if processor 62 successfully destaged the data from the freezers to their corresponding storage devices, then the method continues with step 84. Returning to step 85, if processor 62 chooses not to retrieve existing data from the identified one or more first physical regions, then the method continues with step 88.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   arranging multiple digital information devices having respective storage devices and memories to communicate within a network;
   distributedly storing, for a logical volume, data and first and second parity values across corresponding physical regions of the storage devices;
   distributedly storing, in the memories, multiple freezer nodes having a one-to-one correspondence with each of the multiple storage devices;
   detecting, in a cache for the logical volume, updated data for one or more first physical regions on the storage devices;
   retrieving existing data from the one or more first physical regions, and additional data for use in parity calculations from one or more corresponding second physical regions on the storage devices;
   calculating the first and the second parity values using the updated data, the existing data and the additional data;
   storing the updated data and the calculated first and second parity values to the freezer nodes; and
   destaging the updated data and the calculated first and second parity values from the freezer nodes to the corresponding storage devices.

2. The method according to claim 1, wherein distributedly storing the data and the first and the second parity values comprises storing the data and the first and the second parity values in a redundant array of independent disks (RAID) 6 configuration.

3. The method according to claim 1, wherein each of the freezer nodes comprises a data structure configured to store a data element selected from a list comprising the updated data, the first parity value and the second parity value.

4. The method according to claim 1, wherein distributedly storing a given one of the freezer nodes comprises co-locating, on one of the digital information devices, the freezer node and its corresponding storage device.

5. The method according to claim 1, wherein distributedly storing a given one of the freezer nodes comprises co-locating, on one of the digital information devices, the freezer node and none of the storage devices.

6. The method according to claim 1, wherein the one or more corresponding second physical regions are selected from one or more corresponding physical regions on one or more of the storage devices configured to store the data for the logical volume and one or more corresponding physical regions on two of each the storage devices configured to store the first and the second parity values.

7. The method according to claim 1, and comprising upon detecting a success in destaging first data from a first set of the freezer nodes and a failure to destage second data from a second set of the freezer nodes, the second set comprising one or two of the freezer nodes, retrieving further data from further corresponding regions on the storage devices, and calculating the second data using the first data and the further data.

8. An apparatus, comprising:
multiple digital information devices arranged on a network and having respective memories and storage devices; and
a separate processor coupled to each of the respective memories and configured to distributedly store, for a logical volume, data and first and second parity values across corresponding physical regions of the storage devices, to distributedly store, in the memories, multiple freezer nodes having a one-to-one correspondence with each of the multiple storage devices, to detect, in a cache for the logical volume, updated data for one or more first physical regions on the storage devices, to retrieve existing data from the one or more first physical regions, and additional data for use in parity calculations from one or more corresponding second physical regions on the storage devices, to calculate the first and the second parity values using the updated data, the existing data and the additional data, to store the updated data and the calculated first and second parity values to the freezer nodes, and to destage the updated data and the calculated first and second parity values from the freezer nodes to the corresponding storage devices.

9. The apparatus according to claim 8, wherein the multiple digital information devices comprise modules of a storage controller.

10. The apparatus according to claim 8, wherein a given one or the separate processors is configured to distributedly store the data and the first and the second parity values by storing the data and the first and the second parity values in a redundant array of independent disks (RAID) 6 configuration.

11. The apparatus according to claim 8, wherein each of the freezer nodes comprises a data structure configured to store a data element selected from a list comprising the updated data, the first parity value and the second parity value.

12. The apparatus according to claim 8, wherein a given one or the separate processors is configured to distributedly store a given one of the freezer nodes by co-locating, on one of the digital information devices, the freezer node and its corresponding storage device.

13. The apparatus according to claim 8, wherein a given one or the separate processors is configured to distributedly store a given one of the freezer nodes by co-locating, on one of the digital information devices, the freezer node and none of the storage devices.

14. The apparatus according to claim 8, wherein a given one or the separate processors is configured to select the one or more corresponding second physical regions from one or more corresponding physical regions on one or more of the storage devices configured to store the data for the logical volume and one or more corresponding physical regions on each of two of the storage devices configured to store the first and the second parity values.

15. The apparatus according to claim 8, wherein a given one or the separate processors is configured, upon detecting a success in destaging first data from a first set of the freezer nodes and a failure to destage second data from a second set of the freezer nodes, the second set comprising one or two of the freezer nodes, to retrieve further data from further corresponding physical regions on the storage devices, and to calculate the second data using the first data and the further data.

16. A computer program product, the computer program product comprising:
a non-transitory computer readable storage medium having computer readable program code embodied therewith, the computer readable program code comprising:
computer readable program code configured to arrange multiple digital information devices having respective storage devices and memories to communicate within a network;
computer readable program code configured to distributedly store, for a logical volume, data and first and second parity values across corresponding physical regions of the storage devices;
computer readable program code configured to distributedly store, in the memories, multiple freezer nodes having a one-to-one correspondence with each of the multiple storage devices;
computer readable program code configured to detect, in a cache for the logical volume, updated data for one or more first physical regions on the storage devices;
computer readable program code configured to retrieve existing data from the one or more first physical regions, and additional data for use in parity calculations from one or more corresponding second physical regions on the storage devices;
computer readable program code configured to calculate the first and the second parity values using the updated data, the existing data and the additional data;
computer readable program code configured to store the updated data and the calculated first and second parity values to the freezer nodes; and
computer readable program code configured to destage the updated data and the calculated first and second parity values from the freezer nodes to the corresponding storage devices.

17. The computer program product according to claim 16, wherein the computer readable program code is configured to distributedly store a given one of the freezer nodes by co-locating, on one of the digital information devices, the freezer node and its corresponding storage device.

18. The computer program product according to claim 16, wherein the computer readable program code is configured to distributedly store a given one of the freezer nodes by co-locating, on one of the digital information devices, the freezer node and none of the storage devices.

19. The computer program product according to claim 16, wherein the computer readable program code is configured to select the one or more corresponding second physical regions from one or more corresponding physical regions on one or more of the storage devices configured to store the data for the logical volume and one or more corresponding physical regions on two of each the storage devices configured to store the first and the second parity values.

20. The computer program product according to claim 16, and comprising computer readable program code configured, upon detecting a success in destaging first data from a first set of the freezer nodes and a failure to destage second data from a second set of the freezer nodes, the second set comprising one or two of the freezer nodes, to retrieve further data from further corresponding physical regions of the storage devices, and to calculate the second data using the first data and the further data.

* * * * *